(No Model.)
D. DUNN.
FLUID PRESSURE BRAKE.
No. 570,915. Patented Nov. 10, 1896.
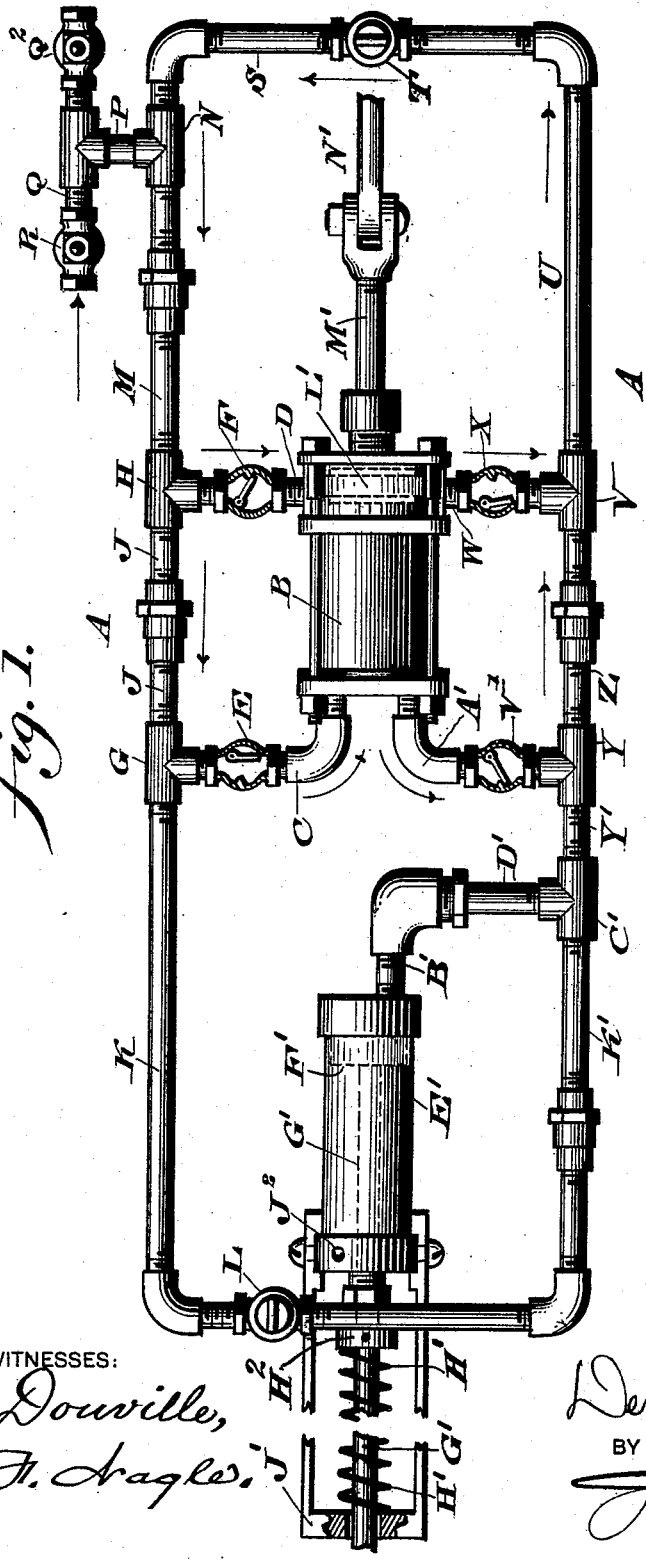
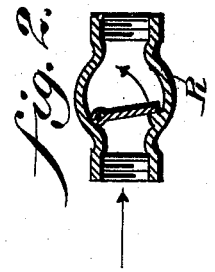
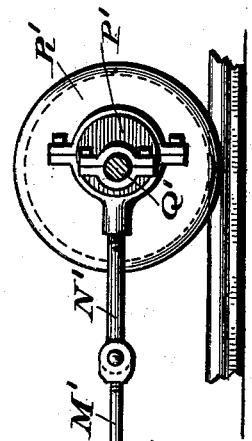
WITNESSES:
L. Douville,
P. H. Aagles.
INVENTOR
Dennis Dunn
BY John A. Wiedersheim
ATTORNEY.
THE NORRIS PETERS CO., PHOTO-LITHO., WASHINGTON, D. C.

UNITED STATES PATENT OFFICE.

DENNIS DUNN, OF MAHANOY CITY, PENNSYLVANIA.

FLUID-PRESSURE BRAKE.

SPECIFICATION forming part of Letters Patent No. 570,915, dated November 10, 1896.

Application filed December 21, 1895. Serial No. 572,841. (No model.)

*To all whom it may concern:*

Be it known that I, DENNIS DUNN, a citizen of the United States, residing at Mahanoy City, in the county of Schuylkill, State of Pennsylvania, have invented a new and useful Improvement in Fluid-Pressure Brakes, which improvement is fully set forth in the following specification and accompanying drawings.
My invention consists of a novel construction of fluid-pressure brake in which provision is made by the reciprocation of a piston and the proper manipulation of a cock in a system of piping for either allowing said piston to reciprocate without applying the brake or for causing said brake to be applied when said cock is turned, the above apparatus being designed to affectively utilize the energy of the revolving axle or other moving portion of the car, which is ordinarily wasted, after the motive power has been shut off, all as will be hereinafter set forth.

It further consists of novel details of construction, all as will be hereinafter set forth.
Figure 1 represents a plan view of a fluid-pressure brake system embodying my invention, the same being shown detached from a car. Figs. 2 and 3 represent, on an enlarged scale, a sectional view of certain checks employed in Fig. 1, to be hereinafter referred to. Fig. 4 represents a detached view, partly in sections, showing the preferred manner of reciprocating the piston.

Similar letters of reference indicate corresponding parts in the several figures.

Referring to the drawings, A designates a portion of a fluid-pressure brake system, the same consisting of the main cylinder B, which is suitably supported and has therein the piston L' and the piston-rod M', of the usual construction.

C and D designate inlet-pipes for said cylinder, the same having located therein the check-valves E and F, from which connections are made to the fitting G and H, the same being joined by the pipe-section J.

K designates a pipe or conduit leading from said fitting G to the cock L, which is shown in closed position.
M designates a pipe or conduit intermediate the fitting H and N, on which latter is mounted the connection P, which has a pipe Q mounted thereon, in which is a check-valve R, the same seating, as is indicated in Fig. 2, said connection P also having the check-valve Q² mounted thereon, said valve seating, as seen in Fig. 3, and serving to permit the exit of the compressed air at the proper times, as will be explained.

S designates a pipe leading from the fitting N to the valve or cock T, (shown in open position,) from which leads the pipe U of the fitting V. W designates connections intermediate said last-mentioned fitting and the cylinder B, said connections having therein the check-valve X.

Z designates a pipe intermediate the fittings V and Y, from which latter leads the pipe A' to the cylinder B, said pipe having therein the valve V', it being of course understood that in the manufacture of the above cylinders and apparatus the check-valves E, F, V', and X may be located in suitable bosses or projections, which are cast or attached directly to the ends of the cylinder B, if desired.

Y' designates a pipe leading from the fitting Y to the fitting C', from which latter leads the pipe D' into the brake-cylinder E'.

F' designates a piston which reciprocates in said brake-cylinder and has attached thereto the piston-rod G', which passes through a suitable stuffing-box and which has mounted in its outer extremity the collar H², against which abuts one end of the spring H', while its other end contacts with the cage J'.

In practice the reciprocation of the piston L' is caused by connecting the piston-rod M to the eccentric-rod N', which latter is connected to the eccentric-strap, which is mounted on the eccentric P', which is secured to the axle Q' of the wheel R', whereupon it will be apparent that the rotation of said car-wheel will cause the reciprocation of said piston L'.

The operation is as follows: The valve L is normally closed and the valve T is normally open, the piston L' being caused to continuously reciprocate, as is evident from Fig. 4. The air is drawn in through the valve R, as is indicated by the arrow, and will circulate through the pipes M, J, C, D, S, U, Z, Y', and A' without causing any movement of the piston F' as long as said valve T is open, as is evident by following the location of the valves, pipes, and their adjuncts. If, now, it should be desired to apply the brakes, the attendant closes the cock T, it being remembered that the reciprocation of the piston L' still continues. The air will then be exhausted from the pipes S, M, J, and K, and will then be drawn in through the valve R, pipe M, and the suction-valves E and F and at each stroke of the pump will be discharged alternately through the pipes A' and W, and since the valves L and T are both closed an accumulation of air under pressure will be instantly caused in the pipes U, Y', D', and K', and the piston F' will be forced to the left, the air escaping through the port $J^2$ as said piston advances to the left, and as the piston-rod G' is connected with the brake-levers it will be seen that the closing of the valve T will instantaneously set the brakes. When it is desired to release the brakes, the cock T is opened once more into the position seen in the figure, the spring H' causing the piston F' to move toward the right, the air then rushing through the pipes S, N, and P and seating valve R and making its exit through valve $Q^2$, which now opens to the atmosphere. Especial emphasis is laid upon the fact that one brake apparatus only is required to be provided for each car, and that in each of the latter the energy which would ordinarily be wasted is utilized to apply the brake after the power is cut off by the proper manipulation of the valve T.

It will be evident that the valve $Q^2$ may be constructed as seen in Fig. 2, or that it may be constructed as a safety-valve which can be set so as to be opened only when a certain predetermined pressure has been obtained within the apparatus, said valve $Q^2$ being adapted to be located anywhere on the pipes M or S, as is evident.

Having thus described my invention, what I claim as new, and desire to secure by Letters Patent, is—

1. A fluid-pressure brake, consisting of a main cylinder having a piston therein, means for operating said piston from the running-gear of a car, a system of piping open to the atmosphere, and communicating with air inlet and discharge pipes connected with said cylinder, a valve in said piping for preventing a discharge of air therefrom to the atmosphere, a brake-cylinder having a piston therein, means for returning said piston to normal position after the application of the brake, a pipe connecting said brake-cylinder with one of the pipes of said system, and a valve in the latter for effecting the application and release of the brake, substantially as described.

2. In a fluid-pressure brake, a main cylinder having a piston therein, means for actuating the same from the running-gear of the car, a pipe Q having check-valves therein substantially as shown, the inlet-pipes C and D connected with said pipe Q and opposite ends of said cylinder, and having check-valves therein, the pipes A' and W, leading from said cylinder and having check-valves therein, a pipe Z in communication with said pipes A' and W, and a brake-cylinder having a conduit leading therefrom to said pipe Z, said pipes Z, U and S connecting said pipes A' and W with said pipe Q, and said pipe S having a valve therein, substantially as described.

3. In a fluid-pressure brake, a main cylinder with a piston connected to a rotating axle, a system of pipes for receiving and discharging air through said cylinder from and to the atmosphere, a brake-cylinder with a piston connected to a brake, a cage containing a spring for releasing said brake, a pipe connecting said brake-cylinder and said system of pipes, and a valve in the latter for shutting off the air from the atmosphere which is discharged from the said main cylinder, said parts being combined substantially as described.

4. In a fluid-pressure brake, a main cylinder having a piston therein, means for actuating the latter from the running-gear of a car, a system of pipes for continuously receiving and discharging air to and from said main cylinder, a brake-cylinder having its piston connected with the brake-rigging, a connection from said system of pipes to said brake-cylinder, and a plurality of valves in said system of pipes, one of said valves being located between the discharge of the main cylinder and the air-exhaust, and when closed being adapted to direct the air from said main cylinder into said connection, and thence into said brake-cylinder, substantially as described.

DENNIS DUNN.

Witnesses:
JOHN A. WIEDERSHEIM,
WM. C. WIEDERSHEIM.